April 3, 1962  E. R. KNOWLES  3,027,596
APPARATUS FOR VACUUM-FORMING DISHED AND FLAT ARTICLES
Filed July 24, 1957  10 Sheets-Sheet 7

April 3, 1962  E. R. KNOWLES  3,027,596
APPARATUS FOR VACUUM-FORMING DISHED AND FLAT ARTICLES
Filed July 24, 1957  10 Sheets-Sheet 10

INVENTOR.
EDWARD R. KNOWLES
BY
Harry B. Rook,
ATTORNEY

United States Patent Office 3,027,596
Patented Apr. 3, 1962

3,027,596
APPARATUS FOR VACUUM-FORMING DISHED AND FLAT ARTICLES
Edward R. Knowles, Fairfield, Conn., assignor, by mesne assignments, to American Can Company, New York, N.Y., a corporation of New Jersey
Filed July 24, 1957, Ser. No. 673,866
17 Claims. (Cl. 18—19)

This invention relates to apparatus for forming concave or cup-shaped articles and for laminating or decorating sheets by action of negative or positive fluid pressure on sheets of thermoplastic compositions such as styrene and polyethylene.

A primary object of the invention is to provide such apparatus which shall employ a novel and improved construction, combination and arrangement of parts whereby plastic articles can be accurately produced at low cost by the use of a plurality of molds or dies mounted on a rotating carrier rotatable about either a horizontal or a vertical axis.

Another object is to provide in a machine of this character a novel and improved construction and combination of a mold and means for moving a portion of a sheet or strip of plastic material in moldable condition into the mold to partially or preliminarily form or shape the sheet prior to the subjection of said sheet or strip in the mold cavity to fluid pressure to force the sheet into tight contact with the walls of the mold and thereby form the desired article.

Another object of the invention is to provide a machine of the character described which shall comprise a large number of molds, for example fifty molds, mounted in equidistantly spaced relation circumferentially of the periphery of a circular carrier that is rotatable about a horizontal axis of a vertical axis, a single means common to all of said molds, including for example a reciprocable plunger, for preliminarily pushing a sheet or strip of plastic material into the molds in succession, and mechanism for mounting and actuating said means in timed relation to the continuous rotation of said molds by said carrier.

A still further object is to provide a machine of the character described which shall comprise a large number of molds mounted in equidistantly spaced relation circumferentially of the periphery of a circular carrier rotatable about its axis, means coacting with each mold including a suction cup movable within said mold to engage by suction or negative fluid pressure a sheet or strip of plastic material overlying the mouth of the mold and pull said sheet into the mold preliminary to subjection of the sheet to fluid pressure within the mold for forcing the sheet into tight conformity with the walls of the mold to produce the desired article .

Another object of the invention is to provide a novel and improved construction and combination of a mold carrier as described for receiving a continuous strip of plastic material in moldable condition directly from an extruder and forming said continuous strip of plastic material into a continuous strip of articles, a take-off wheel for receiving the strip of articles from the die carrier and means for blanking or severing the individual articles from the strip.

Other objects of the invention are to obtain other advantages and results that will be brought out by the following description in conjunction with the accompanying drawings in which

FIGURE 5 is an enlarged horizontal sectional view through one of the molds, taken on the plane of the line 5—5 of FIGURE 6 with the figure turned 90° on the sheet;

FIGURE 16 is a fragmentary central vertical sectional view of the completed cup removed from the mold and severed from the strip;

Specifically describing the embodiment of the invention illustrated in FIGURES 1-10 inclusive, the apparatus includes a die carrier A that is shown as comprising a circular plate or disk 1 having an annular flange 2 projecting integrally and coaxially from one side thereof and in which are mounted a plurality of molds B. The disk 1 is rigidly connected to a horizontal shaft 3 which is journaled in suitable bearings 4 that are mounted on and project upwardly from the base frame C. The carrier A is driven in any suitable manner, for example by an electric motor D the output shaft of which has a sprocket 5 connected by a chain 6 to a sprocket 7 on the shaft 3.

Figure 3:
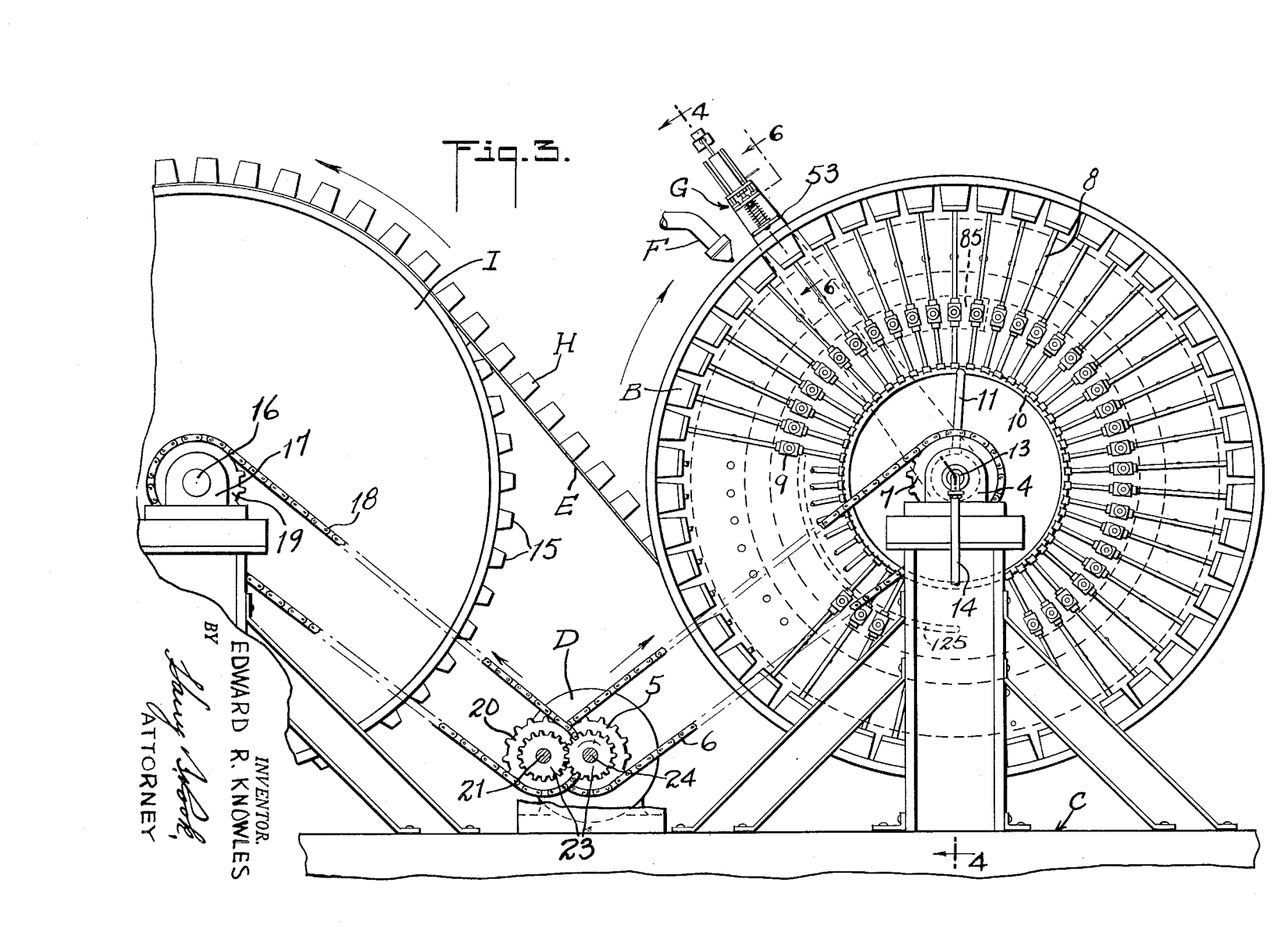
FIGURE 3 is an enlarged elevation of the side of the mold carrier opposite that shown in FIGURE 1 and a portion of the take-off wheel.
Figure 9:
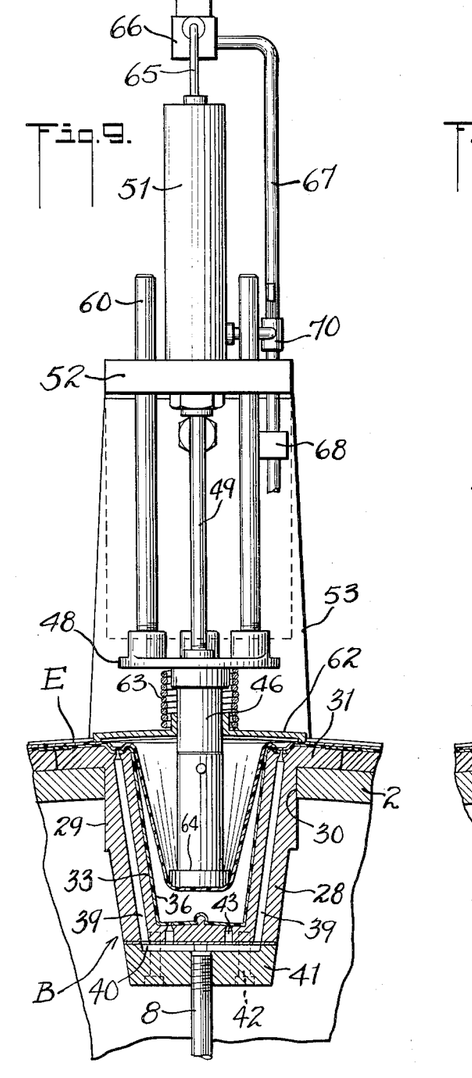
FIGURE 9 is a vertical sectional view taken on a plane at right angles to that of FIGURE 6 and showing an article being preliminarily pushed or displaced into the mold by the plunger of the preliminary forming mechanism.
Figure 10:
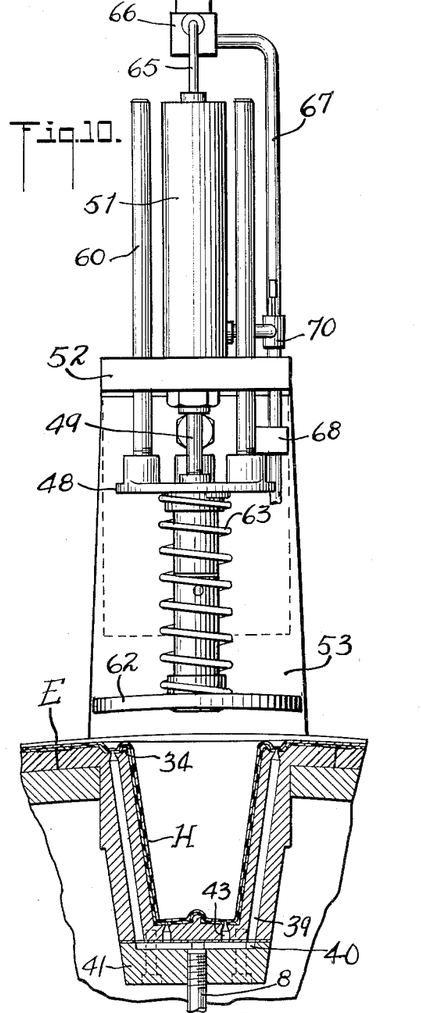
FIGURE 10 is a view like FIGURE 9 showing the formation of the article completed under suction in the mold and showing the plunger of the preliminary forming mechanism withdrawn to its normal position.

A strip E of thermoplastic material is applied to the carrier near the top thereof directly from the nozzle F of a known type of extruding machine so that the carrier will convey said strip from the nozzle in the direction indicated by the arrow in FIGURE 3. Immediately after each mold passes the nozzle F the material of the plastic strip is preliminarily moved into the mold by a preliminary forming mechanism G, as shown in FIGURE 9, whereupon the mold beneath the strip is connected to a vacuum pump or other suitable suction producing apparatus through a tube 8 for each mold controlled by a valve 9 and connected to a manifold pipe 10 which is in turn connected by a pipe 11 to a duct 12 in the shaft 3 which is connected through a suitable packed swivel connection 13 to a pipe 14 that is in turn connected to a suction producing apparatus. A cup or other article H, depending upon the shape of the mold, is thus produced as shown in FIGURE 10 by each mold so that a continuous strip of articles H is led off the mold or die carrier near the bottom thereof by a take-off wheel I that has a plurality of protuberances 15 each to loosely fit into one of the cup-shaped articles H, said take-off wheel I being mounted on a horizontal shaft 16 journaled in bearings 17 on the base frame C and driven by a chain 18 passing around sprockets 19 and 20 on the shaft 16 and a counter shaft 21 journaled in bearings 22 on the base frame and connected by intermeshing gears 23 to the output shaft 24 of the motor D. From the take-off wheel the strip of articles is led over an idler roller 25 to a blanking press K of generally known construction that includes a lower fixed part 26 and a reciprocable upper part 27 that have cooperating cutting elements, such as a punch and a die, for cutting the individual articles from the strip and stacking the articles in nested relation to each other as indicated at L. The completed articles are removed from the blanking press in any suitable manner, while the remaining or scrap portion of the strip that is indicated at E' may be ground up and mixed with new granular or powdered material in known manner and passed through the extruder nozzle F back to the mold or die carrier.

To provide for rapid accurate and mass production of the articles, the mold or die carrier is formed to support a large number of molds. For example, as shown, the flange 2 of the mold or die carrier has a diameter of about eight feet, there are fifty molds and the carrier is rotated at a speed to suit conditions. The take-off wheel I is shown of the same diameter as the mold or die carrier flange 2 and having a number of protuberances 15 corresponding to the number of the molds, and the take-off wheel is driven at the same speed as the die carrier.

While the apparatus may be utilized for forming articles of different shapes, approximately flat or dished, it has been shown in the drawings for producing deep-drawn cups. Each mold B comprises a main section 28 that has an approximately cylindrical portion 29 that is fitted in a hole 30 in the carrier flange 2, and an integral rectangular flange 31 projects from the end of the cylindrical portion 29 and abuts the outer peripheral surface of the carrier flange 2. Preferably, the molds are separably and interchangeably secured to the flange 2 by cap screws 32 the heads of which are countersunk below the outer surface of the flange 31. The mold section 28 has a coaxial mold cavity 33 of a shape corresponding to the outer surface of the cup or other article to be formed. The cavity opens through one end of the section 28; the other end of the cavity is closed and the side walls of the cavity taper or gradually decrease in size from the mouth of the cavity to the bottom thereof. The mouth of the cavity is surrounded by a bead or rib 34 and a groove 35 is provided in the face of the mold in surrounding relation to said rib for the purpose of forming an outwardly extending curved lip on the cup to be formed.

An undercut protuberance 37 projects upwardly from the bottom surface of the cavity to provide an inwardly extending projection on the bottom wall of the cup to be formed.

The face and the interior surface of the mold are provided with a coating 36 of polytetrafluoroethylene or other suitable material which will prevent sticking of the thermoplastic strip E to the mold.

The side walls of the section 28 of the mold are provided with a plurality of ducts 39 each of which opens at one end through the bottom of the groove 35 and at its other end through the bottom of the mold section. The second mentioned ends of the ducts 39 communicate with grooves 40 in the top surface of a bottom plate 41 that is secured to the bottom surface of the section 28 by screws 42. A plurality of ducts 43 is provided in the bottom wall of the section 28 each with one end opening through the bottom surface of the mold cavity and its other end communicating with one of said grooves 40.

One end of one of the tubes 8 is connected to the bottom plate 41 of each mold and communicates with the grooves 40 so that suction can be produced in the tube 8 and the ducts 39 and 43 by the suction producing apparatus.

The portions of the faces of the molds encircling the groove 35 are arcuate and concentric with the flange 2, and in effect form a continuous supporting surface for the strip E of plastic material as the latter is ejected from the extruder nozzle F.

Figure 1:
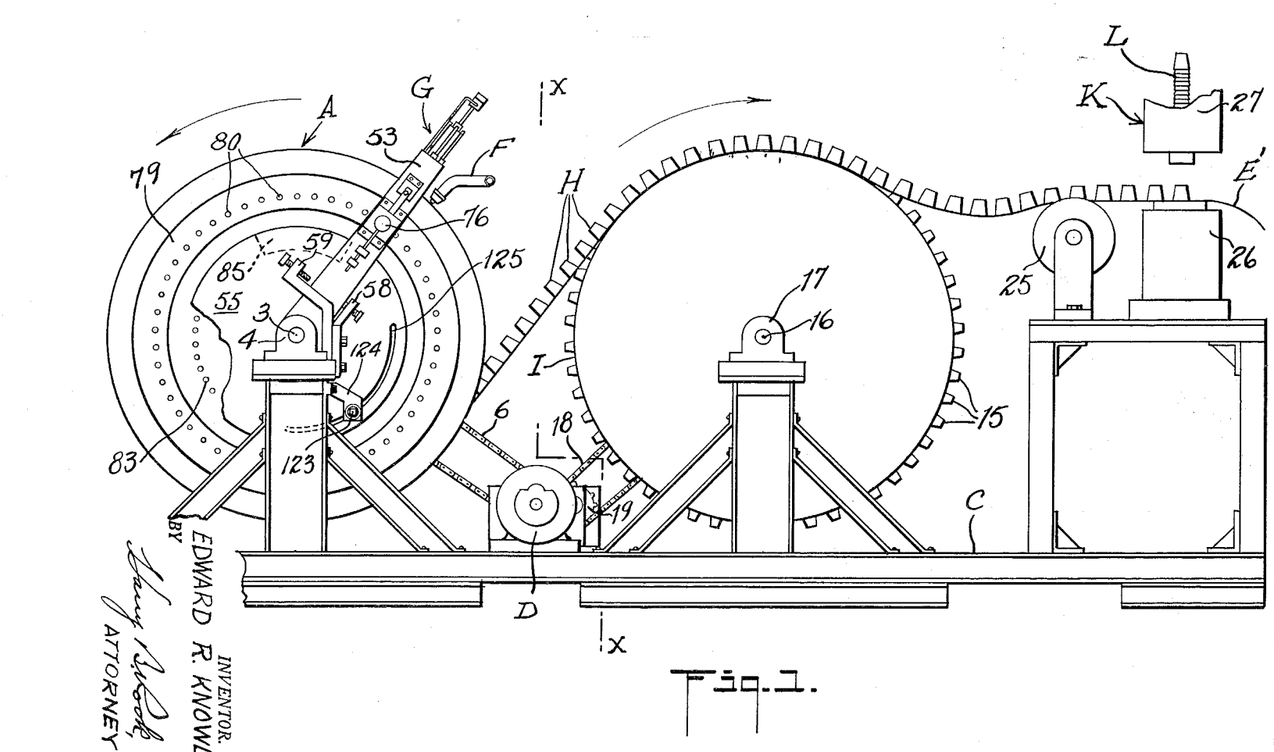
FIGURE 1 is a schematic elevation of one side of the apparatus embodying the invention.
Figure 2:
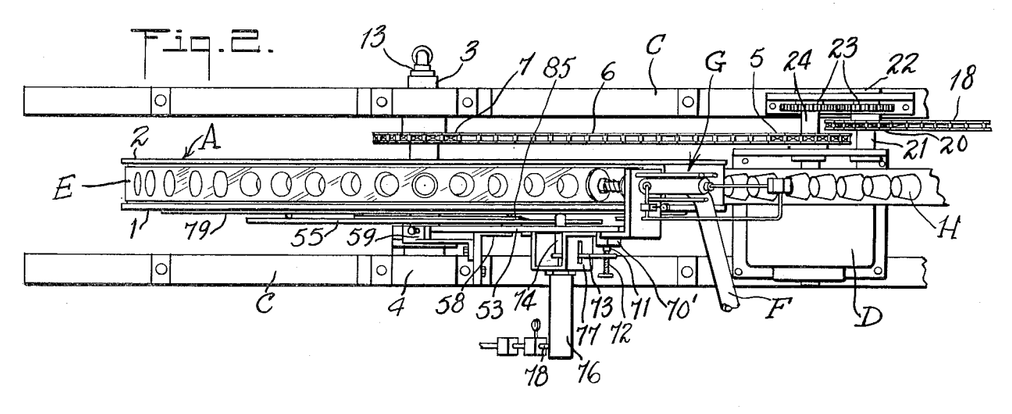
FIGURE 2 is an enlarged top plan view of the portion of the apparatus shown at the left of the line X—X in FIGURE 1, illustrating the mold carrier and the preliminary forming mechanism.
Figure 2A:
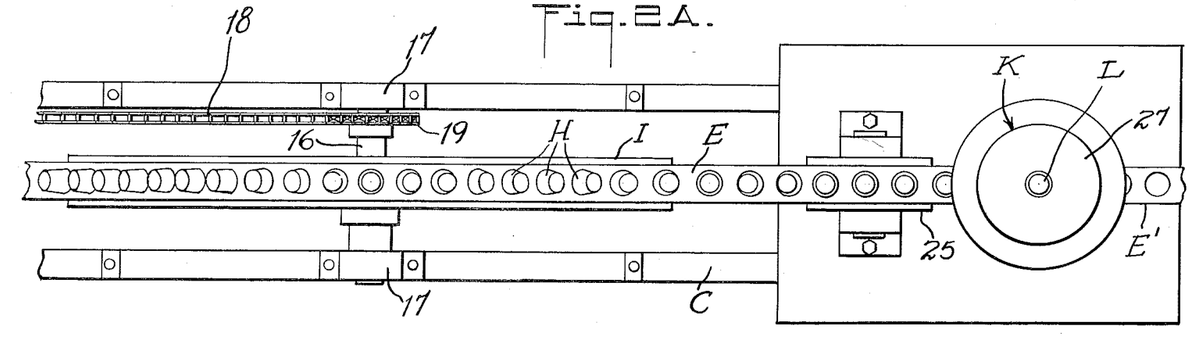
FIGURE 2A is an enlarged top plan view of the portion of the apparatus shown at the right of the line X—X in FIGURE 1, illustrating the take-off wheel and the blanking press.

The plastic strip E of a width substantially greater than the diameter of the groove 35 is continuously fed in soft heated condition from the extruder nozzle into overlying contact with the faces of the molds B as the mold carrier moves in the direction of the arrows shown in FIGURES 1 and 3. In immediate proximity to the nozzle is arranged the preliminary forming mechanism G for initially moving or pressing a portion of the strip into each of the molds while the strip is in moldable condition. As shown, this mechanism G includes a plunger element having a head portion 44 connected at one end by a pivot pin 45 and a shear pin 45' to a stem portion 46 and having its other end enlarged and rounded at 47. The stem portion is carried by and rigidly projects from a drive plate 48 which is connected to one end of the piston rod 49 of the piston 50 of a pneumatic motor the cylinder 51 of which is rigidly mounted on a bracket 52 which is secured to and projects laterally from a combined mounting and actuating first element or lever 53 that is mounted to freely rotate coaxially with the shaft 3. The drive plate and plunger are guided by guide rods 60 connected to the drive plate and slidably mounted in openings 61 in the bracket 52. As shown the carrier disk 1 has a tubular hub portion 54 around the shaft 3 and it serves as a pivotal support for a cam plate 55 which has a tubular boss 56 on which the lever 53 is freely rotatably or pivotally mounted. A cap ring 57 is provided for holding the lever and cam plate against movement off the hub 56 of the carrier disk 1. Normally the lever 53 rests by action of gravity against a stop 58 mounted on the base frame and the lever is moved momentarily by and with the carrier with the plunger head 44 in axial alignment with each of the molds until movement of the lever is stopped by another stop arm 59.

Figures 6, 7, 8:
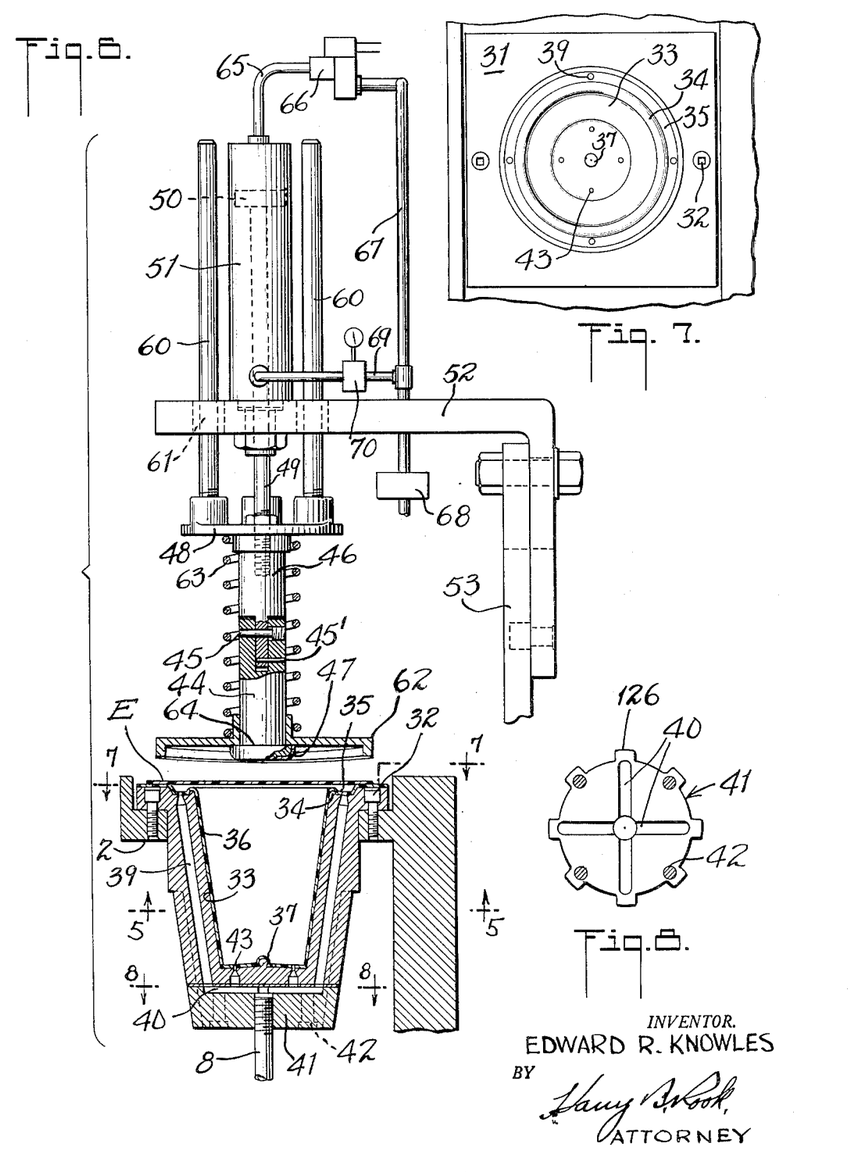
FIGURE 6 is an enlarged fragmentary transverse vertical sectional view approximately on the plane of the line 6—6 of FIGURE 3 showing the plastic sheet on the die carrier and the preliminary forming mechanism in normal inoperative position.
FIGURE 7 is a top plan view of one of the molds and a portion of the mold or die carrier approximately on the plane of the line 7—7 of FIGURE 6 with the plastic strip omitted.

During movement of the lever and plunger with the carrier, the plunger is actuated by the pneumatic motor to push the portion of the sheet overlying the mold cavity from the position shown in FIGURE 6 to the position shown in FIGURE 9 and during this pushing action the portions of the sheet surrounding the groove 35 are gripped between the face of the mold and a clamping plate 62 which is slidably mounted on the plunger stem 46 and is normally biased toward the end of the plunger by a spring 63 which yields as the plate 62 engages the plastic sheet on the mold, as shown in FIGURE 9. Movement of the clamping plate by the spring is limited by a stop shoulder 64 on the plunger stem.

The fluid pressure or pneumatic motor is shown as having one end connected by a pipe 65 to the outlet of a known type of 3-way electromagnetic valve 66 which has a vent to the atmosphere and the inlet of which is connected to a main fluid pressure supply pipe 67 which is in turn connected to a fluid pressure tank. Preferably a pressure regulator 68 of known type will be provided in the pipe 67 so that the pressure of the air entering the cylinder through pipe 65 may be regulated and preferably normally set for about one hundred pounds pressure. Fluid under reduced pressure, for example twenty-five pounds, is supplied to the other end of the cylinder through a branch pipe 69 and pressure regulator or reducer 70.

Figures 4, 8, 15:
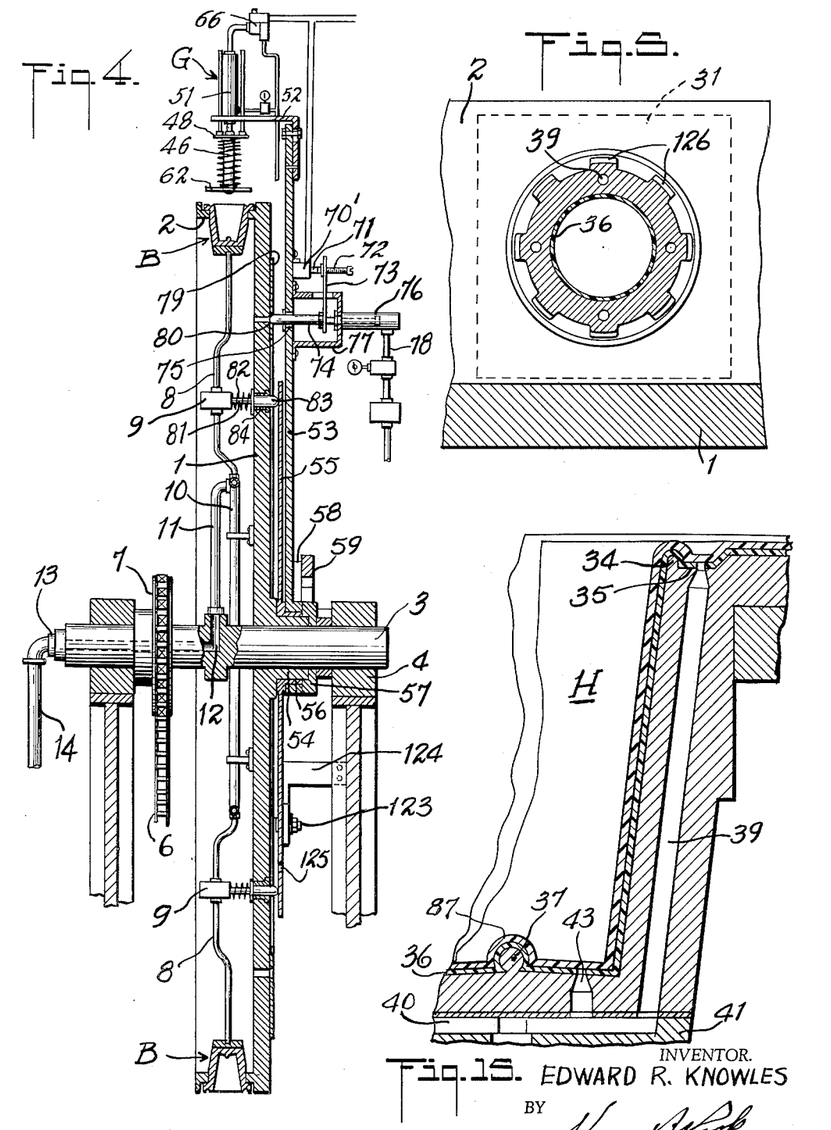
FIGURE 4 is a further enlarged transverse vertical sectional view approximately on the plane of the line 4—4 of FIGURE 3 with portions shown in elevation.
FIGURE 8 is a horizontal sectional view approximately on the plane of the line 8—8 of FIGURE 6 showing the bottom section of the die.
FIGURE 15 is an enlarged fragmentary central transverse vertical sectional view through a portion of the mold and a portion of the completed cup in the mold.

The solenoid of the electromagentic valve 66 is connected in circuit with a known type of normally open micro-switch 70' which is mounted on the lever 53 so that its operating button 71 may be pressed to close the switch by a screw 72 adjustably mounted in an arm 73 that is fixedly connected to a pin 74 which is slidable in and projects through a bearing 75 in the lever and has one end connected to the piston in a piston and cylinder device 76 which is rigidly mounted on a bracket 77 secured to the outer side of the lever 53. Fluid under pressure is constantly supplied through a pipe 78 to the cylinder of the device 76 behind the piston so as to normally yieldingly bias the pin 74 in one direction, that is, toward the carrier disk 1 (FIG. 4). The free end of the pin 74 normally frictionally bears upon a circular bearing plate 79 on the carrier disk, and said carrier disk has a recess 80 for each mold B, said recess being arranged in a circular row so that as each mold reaches a predetermined point in its path of movement with the carrier and when the lever 53 is in its normal or rest position, the end of the pin 74 will be pressed into said recess in such a manner that the lever will be momentarily interlocked with and moved by the carrier, the micro-switch 70' will be closed and the solenoid of the electromagnetic valve will be energized to cause opening of said valve which in turn will admit fluid pressure through pipe 65 and cause actuation of the plunger 44 to preliminarily push the sheet E into the mold cavity. Preferably, means will be provided in the circuit to cause a slightly delayed energization of the solenoid to ensure accurate alignment of the plunger with the mold cavity before actuation of the plunger by the fluid pressure. The movement of the lever 53 with the carrier is continued only long enough to permit the plunger to enter into and withdraw from the mold cavity, and when this has occurred, further movement of the lever will be stopped by the stop arm 59, whereupon the pin 74 will be pushed rearwardly out of the recess 80 and the lever and the parts mounted thereon will return in the opposite direction by gravitational action until the lever reaches its normal position against the stop 58. In the meantime, the switch 70' will have been opened to deenergize the solenoid of the electromagnetic valve 66 and permit the valve to close to shut off fluid pressure in the pipe 67 from the cylinder and simultaneously vent the pipe 65 to the atmosphere so that the piston 50 may be returned to its initial normal position and thus retract the plunger head 44 from the mold cavity. Should faulty operation result in failure of withdrawal of the plunger from the mold cavity, the relative movements of the parts will break the shear pin 45' and permit the plunger head to swing out of the way.

If desired, spring means or some other instrumentalities may be used for returning the lever to its normal position, as will be hereinafter described.

Approximately simultaneously with the pushing of the strip into the mold cavity and the clamping of the strip against the face of the mold, the corresponding valve 9 will be actuated to connect the ducts 39 and 43 to the suction producing apparatus. Any suitable valves may be utilized but as shown, the valves 9 are of a known slide type, each valve having a stem 81 and being normally closed by a spring 82. In accordance with the invention, the valve stem has a head 83 slidably mounted in a bearing 84 in the carrier disk 1 and having a segmentally spherical end frictionally engaging the cam plate 55 on which is an arcuate cam 85 which is of such a length and so located that the valve stem head 83 will engage it in proper timed relation to the preliminary pressing of the plastic sheet into the mold cavity to open the valve and hold the same open for a proper period of time to permit the plastic sheet to be drawn into snug and accurate contact with the inner surface of the mold cavity wall as shown in FIGURE 10.

It will be understood that the mold carrier will become heated from contact with the hot plastic sheet as the latter is applied to the carrier and suitable cooling means will be provided, for example means for directing jets of cold air over the carrier disk, to ensure proper setting and hardening of the molded plastic sheet in the mold cavities.

From the foregoing, it will be understood that during the vacuum-forming of the article H the suction in the ducts 39 will draw portions of the plastic sheet into the groove 35, while the suction in the ducts 43 will draw other portions of the sheet into contact with the walls of the mold cavity, thereby drawing the sheet around the bead or rib 34 to provide an outwardly extending curved lip portion 86 on the finished article (FIG. 15). At the same time the suction in the ducts 43 will draw portions of the sheet snugly around the undercut protuberance 37 at the bottom of the mold cavity and thereby form a projection 87 extending inwardly from the bottom of the article or cup H to be engaged by the bottom of another cup when the cups are in nested relation to each other and thereby prevent the cups from becoming tightly jammed together. The undercut formation of the protuberance 37 provides an opening in the outside of the bottom wall of each cup smaller than the protuberance on the inside of the cup so that the protuberance in one cup will not become stuck in the recess in another cup when the cups are nested together (FIGURE 16).

A modification of the invention is shown in FIGURES 11–14 inclusive where the reference character A' designates the carrier for a plurality of molds B', the carrier being mounted for rotation in the same manner as the carrier A of FIGURES 1–10 inclusive and the molds B' being mounted on the carrier in the same manner in which the molds B are mounted on the carrier A.

Figures 11, 15:
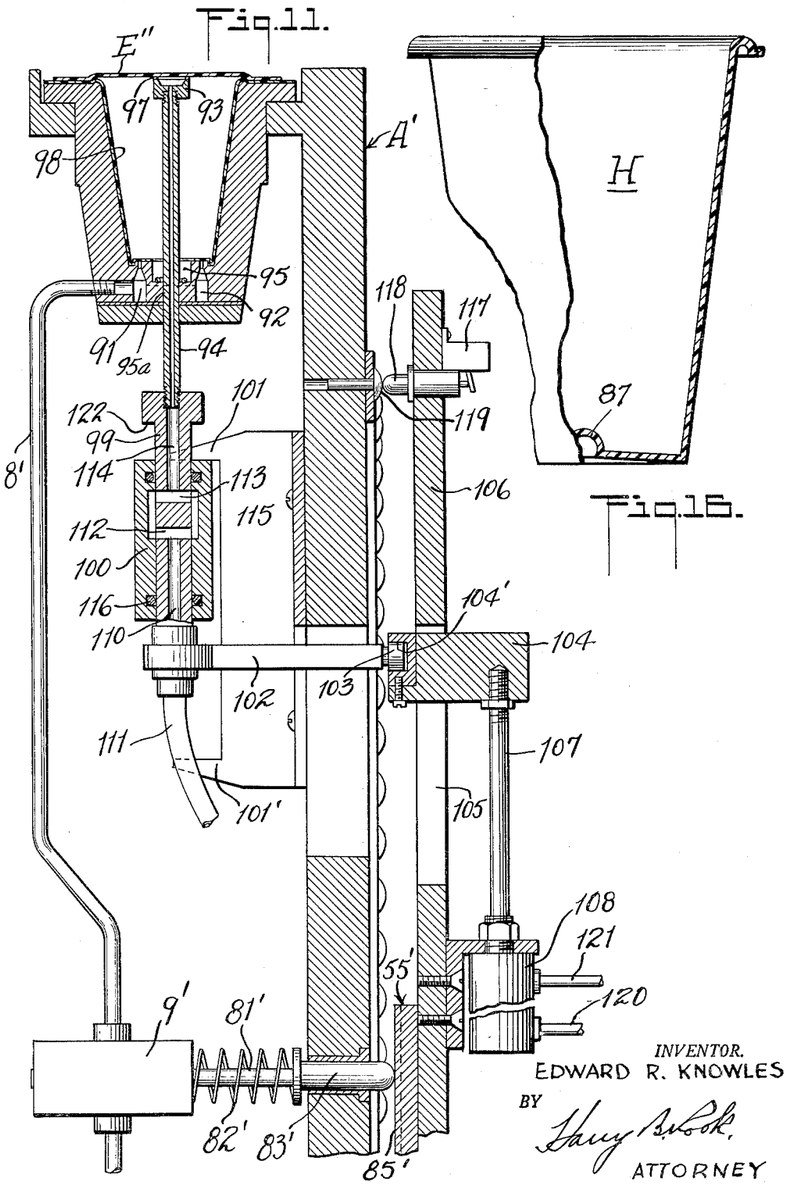
FIGURE 11 is a view similar to FIGURE 6 showing a modification of the invention and with the suction cup of the preliminary forming mechanism in contact with the plastic sheet prior to preliminarily pulling the sheet into the mold.
Figures 12, 13, 14:
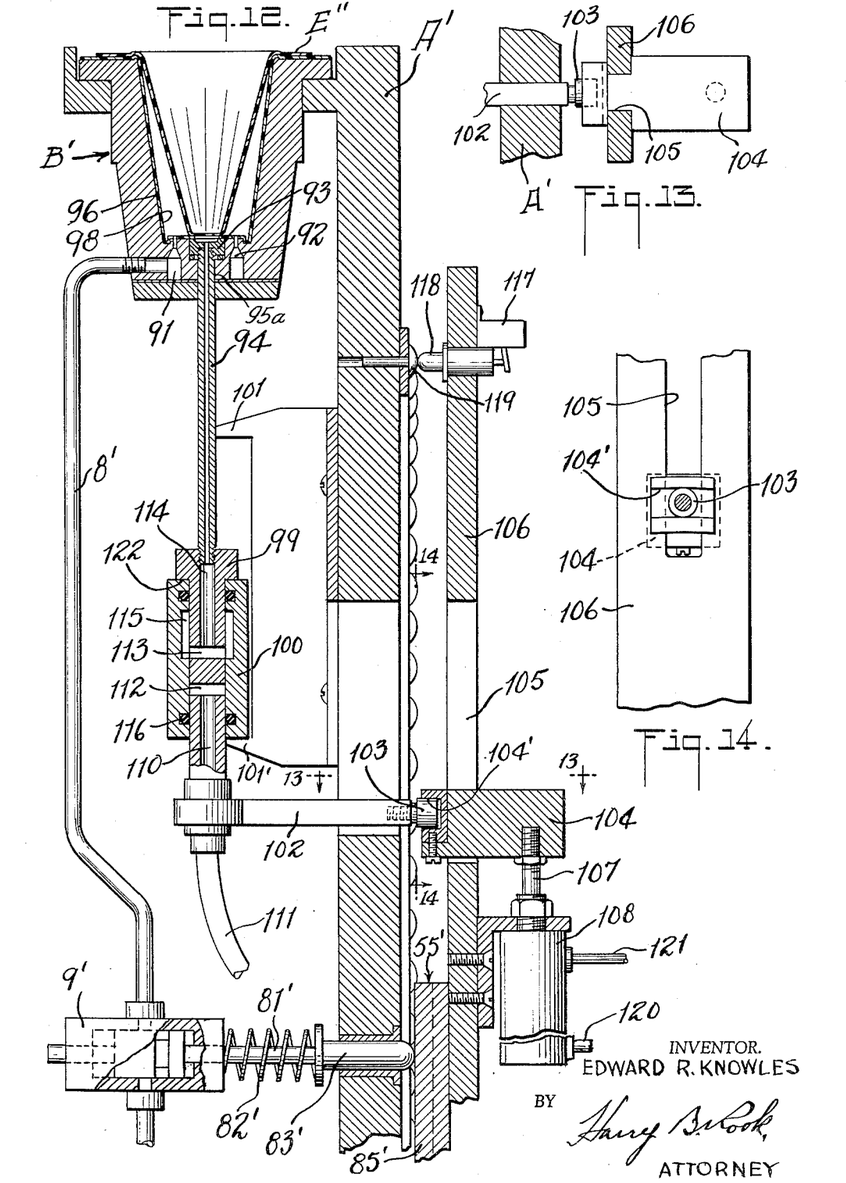
FIGURE 12 is a similar view showing the sheet pulled into the mold.
FIGURE 13 is a fragmentary horizontal sectional view on the plane of the line 13—13 of FIGURE 12.
FIGURE 14 is a fragmentary vertical sectional view approximately on the plane of the line 14—14 of FIGURE 12.

However, in this form of the invention the sheet is pulled by a suction cup into the mold cavity instead of being pushed into the cavity by a plunger. As shown, each mold has a circular passage 91 in its bottom wall which is connected to a tube 8' like the tube 8 and has ducts 92 leading therefrom and through the bottom surface of the mold. A suction head 93 is mounted on the end of an actuating tube 94 and is normally seated in a recess 95 in the bottom wall of the mold as shown in FIGURE 12 but is adapted to be moved along the axis of the mold cavity 96 to the plane of the mouth of the cavity so as to contact with the underside of the plastic sheet E" to be molded as shown in FIGURE 11. The end surface of the suction head that contacts with the sheet preferably has a coating 97 similar to the coating 98 on the wall of the mold cavity to prevent sticking of the head to the sheet. It will be seen that in this form plunger element 44 of the first form is functionally replaced by the suction head element 93, 94. The latter is reciprocably slidable on a first element which has movement in an arc about the carrier axis like lever, 53. In the instance shown, such first element consists primarily of the marginal portions of mold B' surrounding opening 95a receiving and guidingly supporting the actuating tube 94. It will be understood, however, that it may also include any other suitable supporting and guiding means appropriately mounted on the carrier A' if desired.

The actuating tube 94 has its other end connected to a tubular valve body 99 on which is slidable a valve sleeve 100 that is longitudinally movable between two fixed stop fingers 101 and 101' mounted on the carrier A'. The valve body 99 has connected thereto a laterally extending arm 102 at the end of which is a roller 103 which coacts momentarily for a purpose to be described with the walls of a slot 104' in a block 104 that is reciprocable in a slot 105 in a plate 106 that is adjustably mounted on the machine frame. The slot 104' is concentric with the carrier A' and the block 104 is connected to the piston rod 107 of a fluid pressure motor 108 that is mounted on the plate 106 and may be like the device 50, 51 and may be controlled by an electromagnetic valve (not shown) like the valve 66, which in turn is controlled by a normally open micro-switch 117 mounted on the plate 106 and actuated into closed position by a plunger 118 slidably mounted in the plate 106 and engageable by protuberances 119 arranged in a circular row on the carrier disk A', one for each mold similar to the arrangement of the apertures 80.

The valve body 99 has a passage 110 in one end thereof connected to the suction producing apparatus through a tube 111, and a transverse passage 112 communicates with one end of said axial passage 110. A similar transverse passage 113 is provided in the valve body and communicates with an axial passage 114 that in turn communicates with the passage through the actuating tube 94. The valve sleeve 100 has an interior circumferential groove 115 of a length to communicate simultaneously with the transverse passages 112 and 113 as shown in FIGURE 11 and thereby connect the suction producing apparatus to the suction head 93, or to cut off communication between the suction producing apparatus and the suction head as shown in FIGURE 12. The sleeve has a frictional sliding contact with the valve body and suitable packing such as O-rings 116 are provided.

In operation of the machine, normally the parts will be in the positions shown in FIGURE 12 with the suction head 93 in the recess at the bottom of the mold cavity and the suction head will be cut off by the valve 99, 100 from communication with the suction producing apparatus. As the carrier A' is rotated and the plastic strip E'' is laid on the faces of the molds as shown in FIGURE 11, and each mold and its corresponding actuating roller 103 reach a predetermined point in the revolution of the carrier, said roller runs into the slot of the block 104 and approximately simultaneously the protuberance 119 corresponding to said mold actuates the plunger 118 and the micro-switch 117 so that the electromagnetic valve controlling cylinder 108 is opened to cause movement of the block 104, the valve body and sleeve 99, 100 and the suction head 93 upwardly into the positions shown in FIGURE 11 with the face of the suction head in contact with the strip E''. As the suction head approaches the strip, movement of the valve sleeve 100 is stopped by the finger 101 while the valve body continues to move until the suction head engages the strip, whereupon communication is established through the valve passages 115, 113, 112 and 110 with the suction producing apparatus. The strip E'' is thus pulled by suction into contact with the suction head 93 and in the meantime, the protuberance 119 will have disengaged the plunger 118 to permit opening of the micro-switch and consequent deenergization of the solenoid of the electromagnetic valve to cut off the fluid pressure through the pipe 120 at one end of the cylinder 108 that actuated the suction head 93 upwardly into contact with the strip E'' and thereby permit the fluid at lower pressure through the pipe 121, corresponding to the pipe 69, to actuate the piston in the cylinder 108 so as to pull downwardly the suction head 93 and the portion of the strip E'' that is attached thereto, as shown in FIGURE 12. The suction head is thus moved to its normal position and during said return movement, a shoulder 122 on the valve body engages the valve sleeve to move the sleeve downwardly with the valve body until the sleeve engages the lower finger 101', whereupon continued movement of the valve body independently of the sleeve will cause the sleeve to close the passage 112 of the valve body and thereby cut off the suction from the suction head, as shown in FIGURE 12.

Approximately simultaneously, the portion of the strip E'' that has been pulled or displaced into the molded cavity, will be subjected to suction or vacuum within the mold cavity through the pipe 8', passage 91 and ducts 92 so that said portion of the plastic strip will be drawn into snug contact with the walls of the molded cavity 96 to produce a deep drawn cup-shaped article like that shown in FIGURE 15.

As will be understood by those skilled in the art a valve 9' identical with the valve 9 may be used for controlling the communication of the tube 8' with the suction producing apparatus and said valve may have an actuating plunger 81', a spring 82' for normally closing the valve and a plunger head 83' coactive with a cam 85' on a plate 55' that may be mounted like the plate 55. Obviously the inlet of valve 9' can be connected with the suction producing apparatus in the same manner as the valve 9.

It may be desirable in some cases to provide adjustment of the cam 85 and for this purpose the plate 55 carrying said cam may be freely rotatable on the hub boss 56 of the carrier disk and may be clamped in adjusted positions by a bolt 123 mounted in a bracket 124 on the machine frame and passing through a slot 125 in said plate with its head at the side of the plate opposite the bracket so that tightening of the nut on the bolt will rigidly clamp the plate 55 against rotation. A similar adjustment could be provided for the plate 106 in FIGURES 11–14 inclusive.

It will be understood by those skilled in the art that the molds may be formed of any suitable material and in any suitable manner, but preferably they are made of cast aluminum and are provided with cooling fins or ribs 126 so that the heat from the plastic strip may be quickly carried off from the molds by the cooling means such as currents of cold air hereinbefore mentioned.

While the invention has been specifically illustrated and described as applied to the production of cup-shaped articles, it will be understood by those skilled in the art that by changing the shape of the mold or die, a flat strip could be embossed by providing a die face having the desired design embossed thereon with ducts opening through said surface for drawing the strip against the die face; and also a strip of plastic material could be laminated with a sheet of porous fibrous material by superimposing the sheets on a flat die face having ducts opening therethrough and connected to a suction producing apparatus.

Also, if desired, the construction shown in FIGURES 11–14 inclusive could be modified so that the portions of the plastic sheet outside and around the mouth of the mold cavity could be subjected to action of vacuum prior to the displacement of the sheet into the mold cavity so that the sheet would be held against movement relatively to the face of the mold during the preliminary displacement and the drawing of the sheet into conforming contact with the cavity walls.

Furthermore, it will be understood by those skilled in the art that positive fluid pressure instead of negative pressure or suction could be applied to the strip E of plastic material to force the strip into conforming contact with the walls of the mold cavity, although desirably the strip would be preliminarily formed in about the same manner as hereinbefore described.

A modification of the invention is shown in FIGURES 17-21 inclusive wherein a power operated device is provided which, when energized, positively moves the lever 53 in timed relation to the carrier disk 1, and wherein means is provided for subjecting the preliminarily formed strip E of plastic material to a jet of air at the head 47 of the plunger 44 so as to dislodge the strip from the plunger prior to the retraction or withdrawal of the plunger from the mold cavity.

This modification of the invention has been shown in connection with the identical mold carrier A that has a circular series of openings 80 with which cooperates a pin 74' that is identical with the pin 74 and is actuated by a piston and cylinder device 76' which may be the same as the device 76 and has fluid under pressure constantly supplied thereto behind the piston through a pipe 78' whereby the pin is constantly normally yieldingly biased toward the carrier disk 1 to cause the end of the pin 74' to seat in one of the openings 80 as each mold B reaches a predetermined point in its path of movement with the carrier and when the lever 53', corresponding to the lever 53, is in its normal or rest position. The pin 74' has connected thereto an arm 73' in which is adjustably mounted a screw 72' corresponding to the screw 72 to close a normally open micro-switch 70'' which corresponds to the switch 70' and is mounted on the lever 53'.

The means for positively moving the lever 53' in timed relation to the carrier is shown as comprising a piston and cylinder device 130 that is mounted on a vertical standard or post 131 which forms a part of the machine frame C'. One end of the cylinder at one side of the piston is constantly supplied with fluid pressure through a pipe 132 which is shown as connected to the pipe 78' which is in turn connected through a pressure regulator 133 to a main fluid pressure supply pipe 134. Fluid pressure is supplied to the other end of the cylinder at the opposite side of the piston through a 3-way solenoid valve 135 which is mounted on the post 131 and the solenoid of which is connected in circuit with the micro-switch 70'' so that as said switch is closed by movement of the pin 74', the solenoid will be energized and actuate the valve to permit fluid under pressure to flow from the pipe 134 through branch pipe 136, the valve and branch pipe 137 to the cylinder of the device 130 and thereby push the lever 53' in the direction of movement of the carrier A as indicated by the arrow in FIGURE 17. When the pin 74' is moved out of the corresponding opening 80, and the switch 70'' is opened, the solenoid will be deenergized, the valve 135 will be actuated to cut off the supply of fluid pressure to the cylinder and to permit the air in the cylinder to exhaust through the pipe 137 and the valve 135 to the atmosphere, whereupon the pressure at the other end of the cylinder 130 will pull the lever 53' back to its normal position. As shown, this normal position is determined by engagement of the lever with a fixed stop shoulder 138 of a bracket 139 which is mounted on the post 131, and movement of the lever in the other direction, with the mold carrier, is limited by an adjustable stop screw 140 that is mounted in the bracket 139.

As above pointed out, the invention also contemplates means for subjecting the preliminarily or partially formed plastic sheath to a jet of fluid under pressure at the end of the preliminary forming operation so as to dislodge the strip from the end of the forming plunger. The preliminary forming means G' is shown in FIGURES 17-20 as including a cylinder 141 secured at one end on a bracket 142 which in turn is rigidly mounted on an arm 143 which is carried by the upper end of the lever 53'. In the cylinder is reciprocable a piston 144 which is mounted on a tubular piston rod 145 which is slidably mounted in the end walls of the cylinder and has one end projecting from the lower end of the cylinder and connected to a tubular plunger 146 that has a head portion 147 pivotally connected thereto in the same manner in which the head portion 44 is connected to the stem portion 46 of the form of the invention shown in FIGURES 1-4 inclusive. Slidably mounted on the head portion is a clamping plate 148 corresponding to the plate 62, which is normally urged by a compression spring 149 toward the end of the plunger and against a stop shoulder 150 on the plunger.

The passage through the plunger opens through the end of the head portion 147 as indicated at 151 and fluid pressure is supplied to said passage through the tubular piston rod 145 to the upper end of which is connected a solenoid valve 152 fluid pressure to which is supplied through a flexible hose 153 and a pressure reducing valve 158 from the main supply pipe 134. The solenoid of the valve 152 is connected in circuit with a normally open micro-switch 154 that is mounted on the cylinder 141 and which is closed by an arm 155 carried by the piston rod 145, as the plunger head 147 under the influence of the piston 144 approaches the end of the preliminary forming operation, so as to cause a jet of fluid under pressure to be applied through the plunger to the preliminarily or partially formed plastic strip E'' and thereby force the strip away from the end of the plunger so that the plunger may freely return to its normal position without wrinkling or tearing of the plastic strip.

The plunger is actuated in about the same way as is the plunger 46 of the form of the invention shown in FIGURES 1-4, the upper end of the cylinder 141 having fluid under pressure supplied thereto through a flexible hose 156 under control of a 3-way solenoid valve 157, and the other end of the cylinder having fluid pressure constantly supplied thereto through a pressure reducing valve 158 and flexible hose 159. The solenoid valve 157 is connected in circuit with the micro-switch 70'' so that as the pin 74' enters one of the holes 80 in the die carrier, consequent closing of the switch 70'' will energize the solenoid of the valve 157 to permit the supply of fluid pressure through the hose 156 to the upper end of the piston 144 and thereby cause actuation of the plunger 146 into a mold cavity that is positioned beneath the plunger. The fluid pressure will continue to be applied to the piston 144 (the switch 70'' remaining closed) until the arm 53' strikes the stop 140 which halts the motion of the lever and causes the pin 74' to retract from the hole 80 in the die carrier and thus permit opening of the switch 70'' and consequent deenergization of the solenoid valves 157 and 135 so that the air pressure in the cylinder 130 will return the arm to its normal rest position and the pressure below the piston 144 will return the plunger to its normal position.

For safety purposes it is desirable to have a normally closed switch 160 mounted on the stop bracket 139 to be opened by the lever 53' just before the lever strikes its stop screw 140 so as to momentarily open the circuit through the solenoids of valves 157 and 135 just before the lever 53' strikes the stop 140, thereby ensuring the retraction of the plunger 147 from the mold cavity immediately before the arm 53' starts its return movement. This eliminates the danger of the plunger striking the side walls of the mold cavity during the return of the lever.

It will be noted that the plates 62 and 148 must be arcuately curved to conform to the periphery of the flange 2 of the mold carrier and therefore it is necessary to prevent rotation of these plates. Rotation of the plate 62 is prevented by the guide rods 60. Rotation of the plate 148 is prevented by a keyed connection 161 of the plate with the plunger 146, 147 and by the keyed engagement 162 of the plunger 146 with a guide bushing 163 in the arm 143.

In order to ensure operation of the plunger 147 by the fluid pressure motor 141, 144 in proper timed relation to the swinging of the lever 53' and the rotation of the mold carrier, a manually operated off-on switch 170 may be mounted in any suitable location, for example on the arm 143 of the lever 53', and be suitably connected in circuit with the switch 70'' and the solenoid of the solenoid valve 157 so that the plunger will not be operated until the switch 170 is closed and said switch need not be closed until the lever 53' is operating in proper timed relation to the mold carrier A. Such a construction and operation ensures against the plunger 147 entering one of the mold cavities at the wrong time and in such a manner as to become damaged itself or to cause damage to one of the mold cavities.

Figures 17, 22:
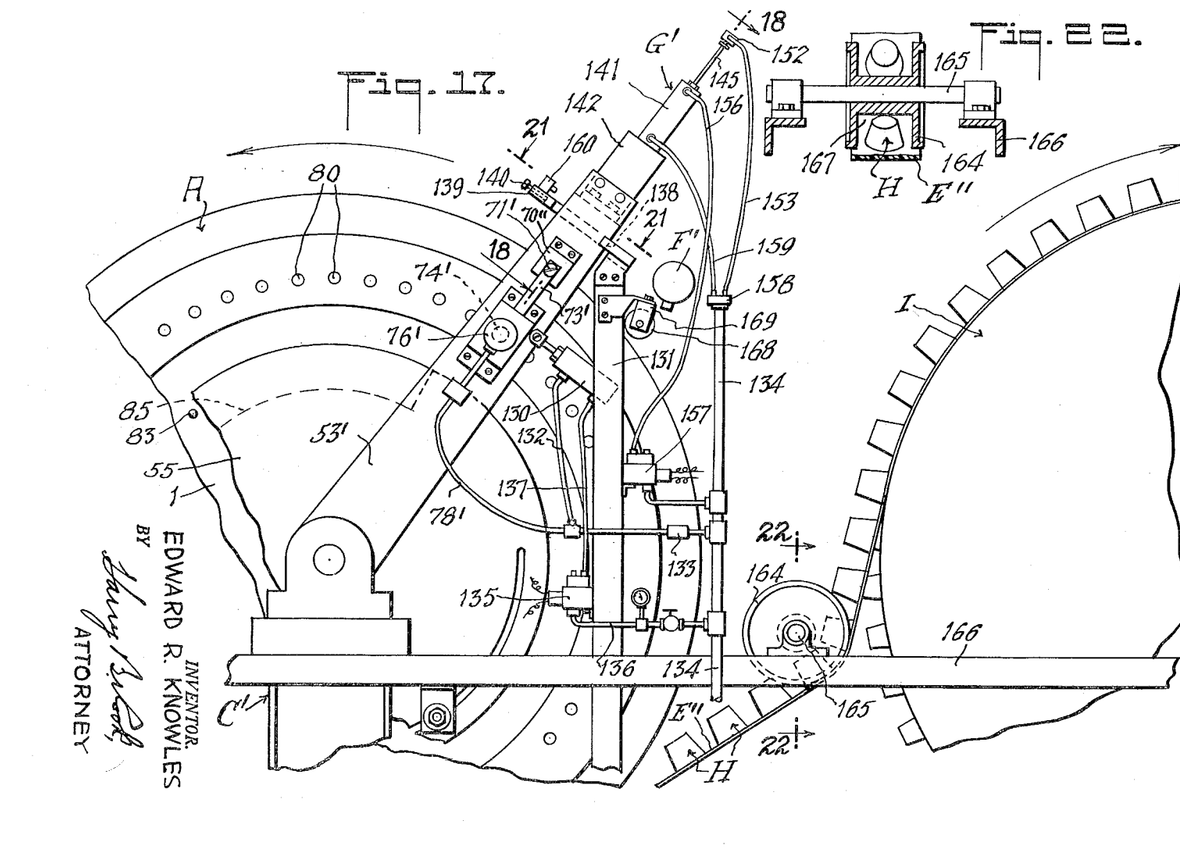
FIGURE 17 is an enlarged fragmentary view similar to FIGURE 1 illustrating a modification of the invention.
FIGURE 22 is a fragmentary vertical sectional view on the plane of the line 22—22 of FIGURE 17.
Figures 18, 19, 20, 21:
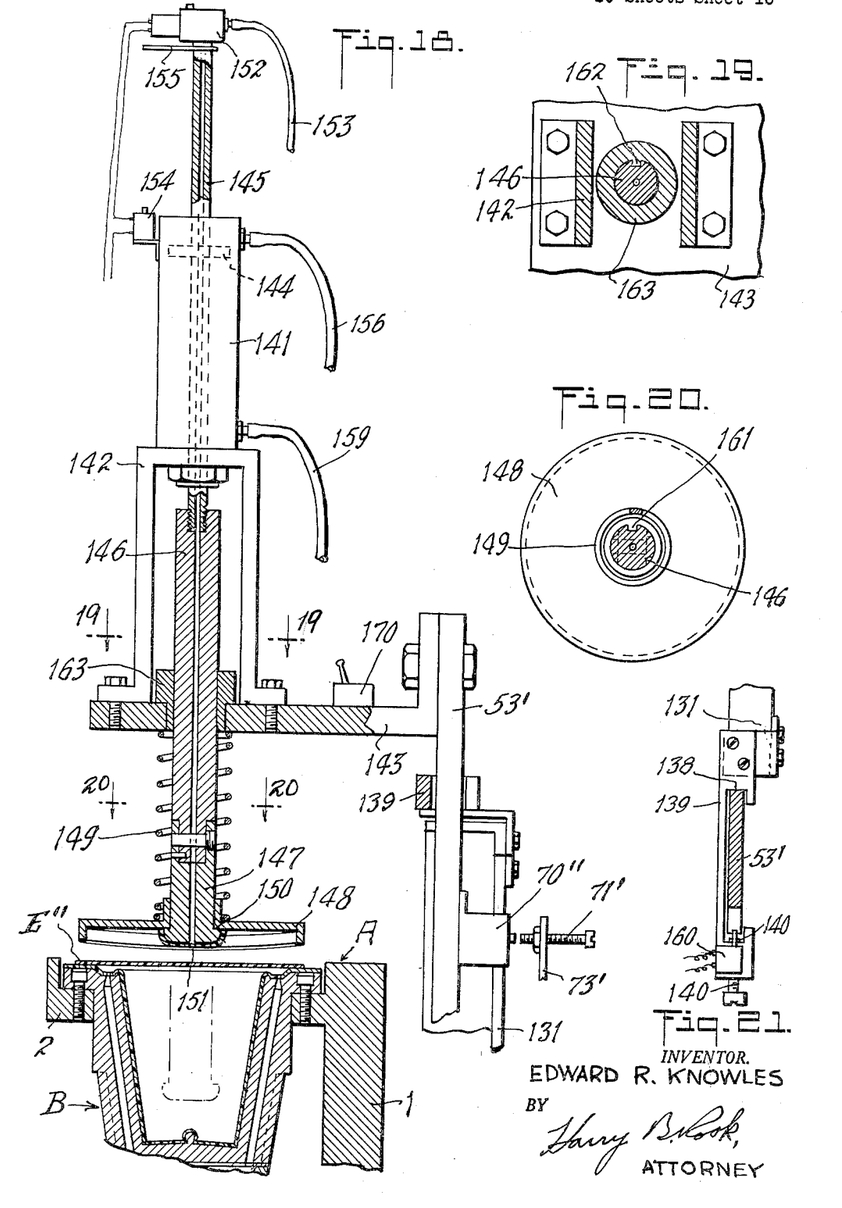
FIGURE 18 is a further enlarged fragmentary transverse vertical sectional view approximately on the plane of the line 18—18 of FIGURE 17.
FIGURE 19 is a horizontal sectional view on the plane of the line 19—19 of FIGURE 18.
FIGURE 20 is a similar view on the plane of the line 20—20 of FIGURE 18.
FIGURE 21 is a fragmentary horizontal sectional view on the plane of the line 21—21 of FIGURE 17.

In some instances it may be desirable to provide an idler take-off or guide roller to guide and pull the molded cups H from the mold cavities, and as shown in FIGURES 17 and 22, a roller 164 is mounted on a shaft 165 which is in turn journaled on horizontal bars 166 forming a part of the machine frame C'. The roller has a large circumferential groove 167 in its periphery to provide clearance for the cups H.

It may be desirable in some instances to provide a guide roller 168 for directing the extruded sheet from the extruder nozzle F' to the periphery of the mold carrier flange 2 into contact with the faces of the molds, and such a roller can be journaled on bearings 169 that are mounted on the frame posts 131.

While the now preferred embodiments of the invention have been shown and described, it should be understood that this is primarily for the purpose of illustrating the principles of the invention and that the structural details of the apparatus may be widely modified and changed within the spirit and scope of the invention.

What I claim is:

1. Apparatus for forming articles of thermoplastic sheet material, comprising a mold carrier mounted to rotate continuously about an axis, a plurality of molds mounted on said carrier in spaced relation in a row circumferentially thereof and movable thereby through a predetermined path, said molds having faces disposed in a series concentric with said axis and having cavities opening outwardly through the respective faces, means continuously rotating said carrier, means supplying a thermoplastic strip in moldable condition to said mold faces in overlying relation to said cavities of said carrier so that said strip will move with said molds, and a first element associated with said carrier mounted for movement through an arc centered on the carrier axis and movable with the carrier through at least a portion of the carrier revolution, a second element shiftable on said first element radially inwardly of the carrier during the movement of said first element to displace a portion of said strip into an adjacent cavity, and means to control shifting of said second element to effect said displacement at a predetermined location relative to the carrier axis.

2. Apparatus as defined in claim 1 with the addition of means for subjecting said portions of the strip to fluid pressure to force said portions of the strip into conforming contact with the walls of said cavities and thereby form a continuous strip of articles, a circular take-off wheel mounted to rotate about an axis parallel to the axis of said mold carrier and having a plurality of protuberances arranged in spaced relation in a row circumferentially thereof in a common plane with said row of molds and each shaped to loosely fit into one of said articles in said strip, and means rotating said take-off wheel in timed relation to the rotation of said mold carrier to exert tension on said strip of articles and thereby dislodge the articles from said molds and convey said strips of articles away from said carrier.

3. Apparatus as defined in claim 1 wherein said first element is a lever mounted to oscillate coaxially with said carrier and having a normal rest position, and said second element is a plunger reciprocably mounted on said lever to move into and out of said mold cavity, means including a part on said carrier and another part on said lever engageable when each mold cavity reaches a predetermined point in its said path of movement to cause movement of said lever with the carrier in one direction, means to cause disengagement of said parts on the carrier and the lever after movement of the lever with the carrier a predetermined distance in said direction, and cause return of the lever in the opposite direction to its said rest position.

4. Apparatus as defined in claim 3 wherein the control means includes a fluid pressure motor on said lever including a reciprocating part connected to said plunger to actuate the plunger into said cavity, and means controlling said fluid pressure motor including an electromagnetic valve a circuit including the solenoid of said valve and a switch on said lever to control actuation of said valve, and wherein said parts on said lever and on said carrier coact to actuate said switch.

5. Apparatus as defined in claim 1 wherein said second element is a suction head in said mold cavity, and said control means includes means for reciprocating said suction head in one direction into contact with said strip and in the opposite direction to pull a portion of said strip into the mold cavity in timed relation to the rotation of said carrier, and wherein is provided means for controlling communication of said suction head with a suction-producing apparatus in timed relation to the reciprocation of said suction head to cause the suction head to grip by suction said portion of said plastic strip when said suction head is moved in the first-mentioned direction into contact with said strip and to pull said portion of the strip into the mold cavity and cut off the suction from said suction head during movement of the suction head in the opposite direction to release said strip from the suction head.

6. Apparatus as defined in claim 5 wherein the last-named means includes a valve mounted on said carrier to control the communication of said suction head with the suction producing apparatus, and means for actuating said valve including a part on said carrier for each mold and a part movably mounted on a support fixed relatively to said carrier momentarily connected to each of the first-mentioned parts as the latter reach a predetermined point in a revolution of said carrier, a motor on said fixed support to actuate the second-mentioned part, and means including an element on said carrier and an element on said support coactive during the engagement of said parts to control said motor.

7. Apparatus as defined in claim 1 which includes a plate yieldingly clamping said plastic strip between the face of the mold and said plate during the displacement of said portion of the strip into the mold cavity.

8. Apparatus as defined in claim 1 wherein said first element is a lever mounted to oscillate coaxially with said carrier and having a normal rest position, and said second element is a plunger reciprocably mounted on said lever to move into and out of said mold cavity, means including a part on said carrier and another part on said lever engageable when each mold cavity reaches a predetermined point in its said path of movement to cause movement of said lever with the carrier in one direction, means to cause disengagement of said parts on the carrier and the lever after movement of the lever with the carrier a predetermined distance in said direction to cause return of the lever in the opposite direction to its said rest position, wherein the means to cause movement of said lever with the carrier includes a power-operated device to positively move said lever in timed relation to said carrier when energized, and means controlled by engagement of said parts on said lever to control energization of said power-operated device.

9. Apparatus as defined in claim 1 wherein said first element is a lever mounted to oscillate coaxially with said carrier and having a normal rest position, and said second element is a plunger reciprocably mounted on said lever to move into and out of said mold cavity, means including a part on said carrier and another part on said lever engageable when each mold cavity reaches a predetermined point in its said path of movement to cause movement of said lever with the carrier in one direction, means to cause disengagement of said parts on the carrier and the lever after movement of the lever with the carrier a predetermined distance in said direction to cause return of the lever in the opposite direction to its said rest position, wherein the means to cause movement of said lever with the carrier includes a power-operated device to positively move said lever in timed relation to said carrier when energized, and means to return said lever to its normal position, and means controlled by engagement and disengagement of said parts on the lever to control energization and deenergization of said power-operated device to move said lever with the carrier and to permit return of the lever to its normal position, respectively.

10. Apparatus as defined in claim 1 wherein said first element is a lever mounted to oscillate coaxially with said mold carrier and having a normal rest position, and said second element is a plunger reciprocably mounted on said lever to move into and out of said mold cavity with one end in and out of contact with said strip, respectively, means to cause oscillation of said lever in timed relation to the rotation of said mold carrier, and wherein said control means includes means controlling reciprocation of said plunger into and out of a mold cavity in timed relation to the oscillation of said lever.

11. Apparatus as defined in claim 1 with the addition of means for subjecting said portions of the strip to fluid pressure to force said portions of the strip into conforming contact with the walls of said cavities and thereby form a continuous strip of articles, the last-named means including a valve on said mold carrier for each mold cavity to control the application of fluid pressure to said displaced portions of the plastic strip, and means for actuating said valves in timed relation to rotation of said carrier and to the operation of said mechanism to cause application of fluid pressure to said portions of said strip.

12. Apparatus as defined in claim 1 with the addition of means for subjecting said portions of the strip to fluid pressure to force said portions of the strip into conforming contact with the walls of said cavities and thereby form a continuous strip of articles, the last-named means including a valve on said mold carrier for each mold cavity to control the application of fluid pressure to said displaced portions of the plastic strip, and having an actuating stem, and a stationary cam on said frame engageable by said stem of each valve to actuate the valve for applying fluid pressure to said portions of the strip.

13. Apparatus as defined in claim 1 wherein said mold carrier is rotatable about a horizontal axis, said strip is applied to the upper portion of said carrier, and wherein said first element is a lever mounted to oscillate coaxially with said mold carrier with its swinging end portion at the upper portion of the carrier, and said second element is a plunger reciprocably mounted on said end portion of the lever to move into an out of said mold cavity with one end in and out of contact with said strip, respectively, means to cause oscillation of said lever in timed relation to the rotation of said mold carrier, said control means including means controlling reciprocation of said plunger into and out of the mold cavity in timed relation to the oscillation of said lever.

14. Apparatus for forming articles of thermoplastic sheet material, comprising a mold carrier mounted to rotate continuously about an axis, a plurality of molds mounted on said carrier in spaced relation in a row circumferentially thereof and movable thereby through a predetermined path, said molds having faces disposed concentrically with said axis and having cavities opening outwardly through the respective faces, means continuously rotating said carrier, means supplying a thermoplastic strip in moldable condition to said mold faces in overlying relation to said cavities of said carrier so that said strip will move with said molds, a suction head in each mold cavity, and means for extending each said head outwardly into contact with an overlying plastic strip and retracting the same inwardly to draw a portion of the strip into the mold cavity.

15. Apparatus as set forth in claim 14 in which there is also provided means for so synchronizing the extension and retraction of the suction heads with the carrier rotation that the extension and retraction of each suction head is effected at a predetermined position about the carrier axis.

16. Apparatus as set forth in claim 15 in which is also provided means coacting with said rotary carrier and said extension and retraction means for connecting a source of suction to each suction head during the retracting movement thereof and disconnecting the same at all other times.

17. Apparatus as set forth in claim 16 in which is also provided means for applying an intermittent vacuum to each mold cavity for a brief period beginning with the completion of retracting movement of the corresponding suction head.

References Cited in the file of this patent

UNITED STATES PATENTS

| | | |
|---|---|---|
| Re. 23,171 | Borkland | Nov. 29, 1949 |
| 1,481,866 | Heist | Jan. 29, 1924 |
| 1,624,849 | Steel et al. | Apr. 12, 1927 |
| 1,654,647 | Heist | Jan. 3, 1928 |
| 2,007,548 | Sampson | July 9, 1935 |
| 2,282,423 | Kopitke | May 12, 1942 |
| 2,529,083 | Keefe | Nov. 7, 1950 |
| 2,568,094 | Smith | Sept. 18, 1951 |
| 2,648,099 | Dunmire | Aug. 11, 1953 |
| 2,688,995 | Wagoner | Sept. 14, 1954 |
| 2,740,444 | Martinella | Apr. 3, 1956 |
| 2,749,572 | Nowak | June 12, 1956 |
| 2,770,011 | Kelly | Nov. 13, 1956 |
| 2,799,048 | Stirn et al. | July 16, 1957 |

FOREIGN PATENTS

| | | |
|---|---|---|
| 1,144,195 | France | Apr. 29, 1957 |

OTHER REFERENCES

"Blow Molding Opens Opportunites to Plastics" (Bailey), Apr. 1945, pp. 70, 72, 74, 75, 118, 119, 120.